C. P. STEINMETZ.
SYSTEM OF DISTRIBUTION.
APPLICATION FILED AUG. 13, 1909.
946,473.
Patented Jan. 11, 1910.
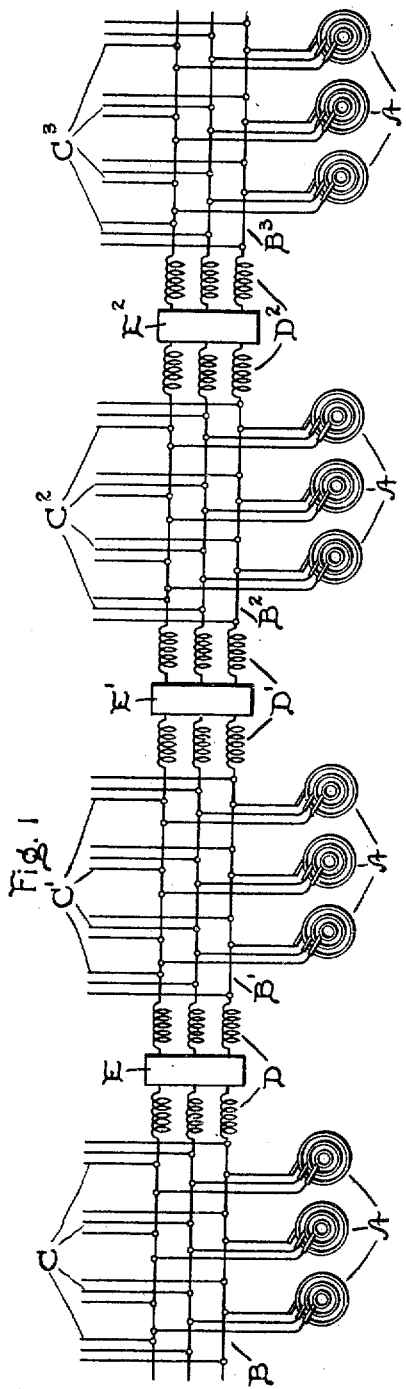
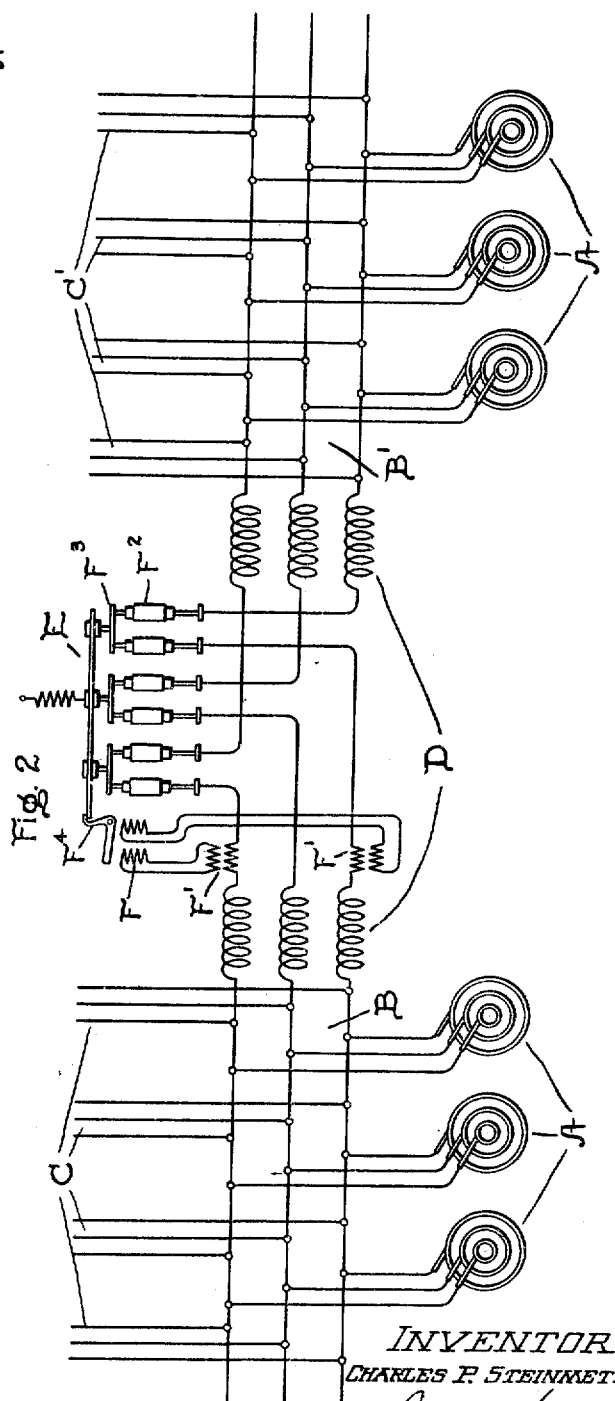
WITNESSES:
Lester H. Fulmer
J. Ellis Glen
INVENTOR
CHARLES P. STEINMETZ
BY
ATT'Y.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

SYSTEM OF DISTRIBUTION.

946,473.

Specification of Letters Patent.    Patented Jan. 11, 1910.

Application filed August 13, 1909. Serial No. 512,671.

*To all whom it may concern:*

Be it known that I, CHARLES P. STEINMETZ, a citizen of the United States, residing at Schenectady, county of Schenectady, State of New York, have invented certain new and useful Improvements in Systems of Distribution, of which the following is a specification.

My invention relates to systems of distribution, particularly systems in which a number of generators are connected in parallel to a common set of bus bars, and its object is to restrict the flow of current resulting from a short circuit on the bus bars to predetermined amounts which will not be destructive, and are within the capacity of switches now available.

In modern generating systems and large power houses it is customary to connect all of the generators in parallel to common conductors or bus bars from which the various feeders are supplied. In order to localize as much as possible the effects of a short circuit or similar break-down the bus bars are often divided into a number of sections connected to each other through automatic switches, and in case a short circuit causes an excessive flow of current into any section of the bus bars the automatic switches at each end of that section open and thereby isolate the damaged part of the system. Even though the individual generators are of comparatively moderate power, they are all connected to the bus bars and hence a short circuit which reaches the bus bars, brings into action the power of the entire system and will result in a flow of current on the bus bars equal to the combined short circuit current of all the generators. In modern generating systems the generators are usually turbine driven alternators which on short circuit will give a momentary short circuit current of between forty and fifty times the full load current, consequently the momentary short circuit current on a system supplied from turbine driven alternators which have a combined full load capacity of 50,000 or 100,000 kilowatts is so great that there is no switch available which can be relied on to handle the rush of current on the bus bars and safely disconnect one section of the bus bars from the other sections in case a short circuit should occur on one section of the bus bars.

In carrying out my invention, the bus bars are divided into any desired number of sections of moderate size, and these sections are connected together through some current choking connection or device, such as a reactance, so proportioned that the current which can flow from one section of the bus bars to another is limited to some predetermined amount which can be easily handled by switches now available. The sections are preferably connected by means of automatic switches or circuit breakers in series with the current choking connections, these switches being so set that they will open only in case a severe short circuit reaches the bus bars.

My invention will best be understood in connection with the accompanying drawings which illustrate one of the various forms in which the invention may be embodied, and in which—

Figure 1 is a diagrammatic illustration of a power house having twelve generators connected to common bus bars and Fig. 2 is a diagrammatic illustration showing an automatic switch or circuit breaker connected between two sections of the bus bars and in series with reactances which limit the amount of current flowing from one section to the other.

In the specific arrangement diagrammatically shown in the drawings twelve generators A are connected to a common bus bar divided into four sections B, B¹, B², and B³, each section supplying a number of feeders C, C¹, C² and C³. The sections are connected to each other through any suitable current choking connection which will limit the flow of current between adjacent sections to some predetermined amount, the preferable form of current choking connection being some form of impedance or choke coil such as the reactances D, D¹ and D², connected between the sections as shown in Fig. 1 and each containing a switch or circuit breaker E by means of which each section may be disconnected from the others if desired. The switch or circuit breaker E is preferably made in the form of an automatic oil switch provided with tripping coils F energized by current derived from series transformers F¹ connected between the adjacent sections of the bus bar, and usually so set that the switch will be opened only in case of a short circuit either upon the bus bars or so close to them that the flow of current is excessive. The switch is only shown diagrammatically, F² representing oil pots and F³ bridging contacts which make the circuit between the base sections when latched down by a latch F⁴, which is controlled by the trip coils F. When conditions are normal the reactances have no appreciable effect because comparatively little current flows between adjacent sections of the bus bars and hence the reactances do not cause any appreciable voltage difference and do not interfere with parallel operation of the generators.

The reactances can be made to have any desired choking effect upon the current between adjacent sections of the bus bars, but if it be assumed that each reactance is of such value as to give about 20 per cent. voltage with full load current of one generator flowing over it, then if a short circuit should occur on one section of the bus bar, for example the section B¹, this section could receive over the two reactive coils D and D¹ which connect it to the adjacent sections only about ten times the full load current of one generator, an amount of current which can easily be opened by the two automatic oil switches E and E¹.

By the use of current choking connections or reactances connected as above described, an unlimited extension of the system is possible without increasing the destructive effects of a short circuit on the bus bar, since the flow of current due to short circuit can be limited to an amount well within the capacity of the switches, regardless of the number of generators connected to the system by increasing the number of bus bar sections and properly proportioning the reactances connected between the sections.

My invention may be embodied in many other forms than that shown and described, and I do not wish to be restricted to the precise arrangement shown, but intend to cover by the appended claims all changes and modifications within the spirit and scope of my invention.

What I claim as new and desire to secure by Letters Patent of the United States is,

1. A system of distribution comprising a bus bar divided into sections, a plurality of generators connected to said sections and current choking connections between said sections.

2. A system of distribution comprising a plurality of generators, a plurality of bus bar sections connected to said generators, switches between adjacent bus bar sections and current choking connections between said sections in series with said switches.

3. A system of distribution comprising a bus bar having sections, generators connected to said sections, and connections between adjacent sections of sufficient impedance to limit the current between sections to a predetermined amount.

4. A system of distribution comprising a bus bar having sections, generators connected to said sections, and reactances connected between adjacent sections.

5. A system of distribution comprising a bus bar having sections, an automatic circuit breaker between adjacent sections and current limiting connections between said sections in series with said circuit breaker.

6. A system of distribution comprising a bus bar divided into sections, a generator connected to each section, an automatic circuit breaker between adjacent sections, means responsive to abnormal current between sections for opening said circuit breaker, and a reactance connected in series between said circuit breaker and an adjacent section to limit the flow of current between sections.

In witness whereof, I have hereunto set my hand this 12 day of August, 1909.

CHARLES P. STEINMETZ.

Witnesses:
 BENJAMIN B. HULL.
 MARGARET E. WOOLLEY.